H. W. AITKEN.
ROLLER FOR SUGAR CANE MILLS.
APPLICATION FILED JULY 29, 1913.
1,114,426.
Patented Oct. 20, 1914.
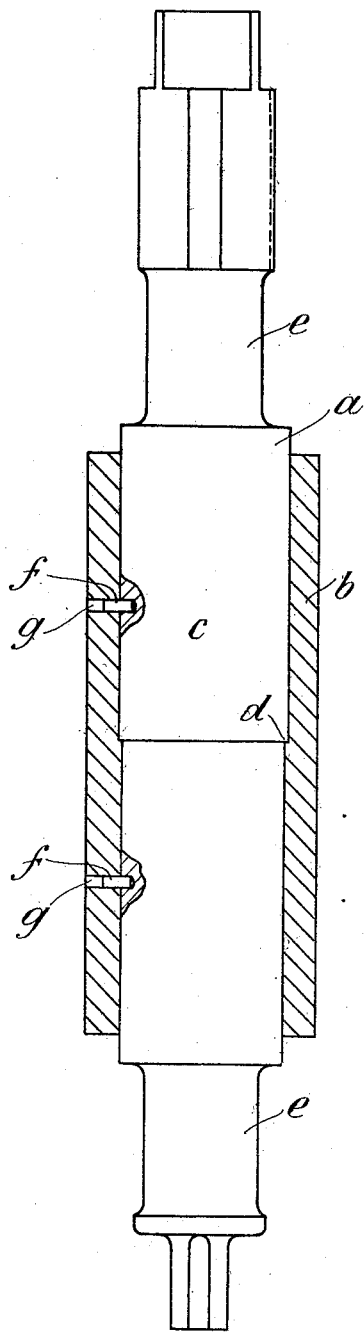

UNITED STATES PATENT OFFICE.

HUGH WALLACE AITKEN, OF GLASGOW, SCOTLAND.

ROLLER FOR SUGAR-CANE MILLS.

1,114,426.

Specification of Letters Patent. Patented Oct. 20, 1914.

Application filed July 29, 1913. Serial No. 781,730.

*To all whom it may concern:*

Be it known that I, HUGH WALLACE AITKEN, a subject of the King of Great Britain and Ireland, residing at 147 Bath street, Glasgow, Scotland, have invented certain new and useful Improvements in Rollers for Sugar-Cane Mills; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to rollers of sugar cane mills. The rollers of sugar cane mills are usually constructed of cast iron casings or shells mounted on wrought iron or steel shafts. The casings are usually cast hollow and bored out to receive the shaft. They are usually either forced on to the shaft by hydraulic pressure or are expanded by heat and shrunk on to the shaft. They usually make contact with the shaft at the ends only or at the ends and middle. They are secured on the shaft and prevented from rotating relatively thereto by means of fitted keys driven into keyways parallel to the axis of the shaft. The loads which the rollers have to carry are very severe, and shafts often break, frequently just inside the roller casting or casing, the fracture being caused by the excessive bending and torsional strains to which the shaft is subjected. Fracture of the shaft inside the casing is also often caused by the juice finding its way into the hollow between the casing and the shaft, (due in some cases to the keys not being properly fitted in the key-ways) and there fermenting and corroding the shaft and the part of the roller casting or casing bearing on it. Also, rollers in time get worn on the surface and either the roller casing must be replaced or a complete new roller, i. e., casing and shaft be provided. The withdrawing of the fractured shaft from the roller casing and the insertion of a new shaft in the old casing, and likewise the insertion of an old shaft in a new casing, are serious matters and difficult to perform at the sugar factory.

The object of the present invention is to produce a roller with a shaft which from its dimensions is unlikely to break, and with a casing or shell which can be easily and cheaply renewed.

The invention, which will be described in the following specification and more definitely set forth in the annexed claims, consists in a construction of roller comprising a shaft of very tough material of great tensile strength inclosed and provided with a portion of enlarged diameter and considerable length, which portion is frictionally gripped by a sleeve of very hard material, the thickness of the sleeve being small compared with the diameter of the shaft.

The shaft should be of material—say steel or wrought iron—which is of great tensile strength and is also very tough. The sleeve, which is preferably of very hard and open-grained cast iron, is bored with an internal diameter slightly less than the external diameter of the shaft and is preferably mounted on the shaft by being expanded by heat and slipped when hot on to the shaft and shrunk on. Hydraulic or other pressure may, however, be employed if desired, with or without heat, to force the sleeve on to the shaft; but it is an essential feature of my invention that the sleeve when cold is secured on the shaft by friction caused by strain, the sleeve being subjected to tensile strain and the shaft to compressive strain. I consider that the sleeve should be bored from about 0.06 per cent. less than the external diameter of the shaft but as the texture, tensile strength and other properties of the sleeve vary according as it is made of hard iron suitable for grinding hard canes or soft iron suitable for grinding soft canes, the percentage difference between the bore of the sleeve and the diameter of the shaft may be as high as 0.1 for very hard iron and 0.02 for soft iron. The relatively large diameter of the shaft not only provides a relatively great surface of contact between sleeve and shaft and so augments the aggregate friction but also furnishes a relatively great leverage for the friction. The moment of frictional grip, or the frictional torque, is thus increased for two reasons. In order to still further augment the frictional grip, I provide a relatively great (axial) length of contact surface. I prefer to arrange that the whole, or nearly the whole, interior surface of the sleeve makes contact with the whole, or nearly the whole, inclosed surface of the shaft and that the length—or aggregate length—of the contact surface shall be not less than one and a half times the external diameter—i. e., the diameter of the crushing surface—of the roller.

By constructing a roller as above mentioned, it is possible to dispense with fitted keys as heretofore used, as, when the roller is cold, the friction is quite sufficient to prevent slip between sleeve and shaft even under the most adverse conditions of load. The absence of fitted keys and the relative lightness of the sleeve render it comparatively easy to place the latter on its shaft; and a sleeve, when broken or much worn, can be readily and at comparatively small cost replaced by a new one. The shaft, owing to its excessive strength, is unlikely to be bent or broken.

In order to successfully apply my invention and get full advantage therefrom, I consider it desirable that the diameter of the shaft where inclosed by the sleeve should be between 65 per cent. and 85 per cent. of the external diameter of the sleeve (excluding flanges), although it might be possible to work with very slight risk and partly secure the advantages of my invention with a shaft diameter slightly less than 65 per cent. of the sleeve diameter but certainly not less than 60 per cent.; and, if the sleeve were of very tough material, it might be possible without much risk to exceed 85 per cent.

The accompanying drawing is a longitudinal section of a roller according to my invention.

$a$ is the shaft provided with portion $c$ of enlarged diameter between the bearings $e, e$.

$b$ is the sleeve situated on this enlarged portion. The sleeve may be bored of one internal diameter throughout, or it may be bored with one or more steps such as $d$, and the shaft machined with a corresponding shoulder or shoulders. The latter construction assists in the placing of the sleeve on the shaft.

As the roller may sometimes be subjected to the action of hot water in order to assist in the expression of the juice after the first crushing of the cane; and, as the sleeve may therefore get heated before the shaft and thus be temporarily at a higher temperature than the shaft, there may be a tendency to reduce the frictional grip of the sleeve on the shaft. In order to obviate any chance of slip occurring on such occasions, I may provide pins which are placed in holes bored in the sleeve and shaft, for example, as shown at $f, f$ in the drawing. These pins may be either screwed or dropped into place; and plugs such as $g, g$ of the same material as the sleeve may, if necessary, be screwed in after them and made flush with the outside of the sleeve. It is to be understood that these pins are only intended to act for short intervals of time as the shaft will quickly attain the same temperature as the sleeve; and, moreover, the temporary stresses—if any—to which the pins are subjected cannot be great.

Having thus described my invention, what I claim as new and desire to secure by Letters Patent is:—

1. A roller for crushing sugar cane, comprising a shaft having an enlargement integral therewith and of very tough material and great tensile strength, a sleeve of very hard material in frictional engagement with said enlargement and of greater length than its diameter so as to provide sufficient gripping surface and stiffness and through said enlargement prevent undue stresses and strains in the shaft and sleeve at the ends of the latter, and the diameter of said enlargement being not less than approximately 60% nor more than approximately 90% of the external diameter of said sleeve, whereby adequate strength is imparted to said shaft and sleeve.

2. A roller for crushing sugar cane, comprising a shaft having an enlargement integral therewith and of very tough material and great tensile strength, a sleeve of very hard material in frictional engagement with said enlargement and of greater length than its diameter so as to provide sufficient gripping surface and stiffness and through said enlargement prevent undue stresses and strains in the shaft and sleeve at the ends of the latter, and the diameter of said enlargement being not less than approximately 60% nor more than approximately 90% and the length being not less than approximately 150% of the external diameter of said sleeve, whereby adequate strength is imparted to said shaft and sleeve.

In testimony whereof I have signed my name to this specification in the presence of two subscribing witnesses.

HUGH WALLACE AITKEN.

Witnesses:
ROBERT MORRISON NEILSON,
FRED MIDDLETON.

Copies of this patent may be obtained for five cents each, by addressing the "Commissioner of Patents, Washington, D. C."